United States Patent [19]

Scheckenbach et al.

[11] Patent Number: 5,948,830
[45] Date of Patent: Sep. 7, 1999

[54] MIXTURES OF LIQUID-CRYSTAL POLYMERS AND POLYARYLENE SULFOXIDES, FOAMS MADE OF SUCH MIXTURES, PROCESS FOR THEIR PRODUCING THE SAME AND THEIR USE

[75] Inventors: Helmut Scheckenbach, Langen; Dirk Raudies, Elsoff; Andreas Schleicher, Beselich; Georg Frank, Tübingen, all of Germany

[73] Assignee: Ticona GmbH, Germany

[21] Appl. No.: 08/793,216

[22] PCT Filed: Aug. 2, 1995

[86] PCT No.: PCT/EP95/03082

§ 371 Date: May 2, 1997

§ 102(e) Date: May 2, 1997

[87] PCT Pub. No.: WO96/05252

PCT Pub. Date: Feb. 22, 1996

[30] Foreign Application Priority Data

Aug. 15, 1994 [DE] Germany ............... 44 28 726
Sep. 28, 1994 [DE] Germany ............... 44 34 639

[51] Int. Cl.⁶ .................................................. C08J 9/04
[52] U.S. Cl. ................... 521/77; 521/81; 521/138; 521/182
[58] Field of Search ................ 521/77, 81, 138, 521/182

[56] References Cited

U.S. PATENT DOCUMENTS 4,710,522  12/1987  Huggard ........................ 521/138

FOREIGN PATENT DOCUMENTS 0044177   1/1982   European Pat. Off. .
0409482   1/1991   European Pat. Off. .
0470557   2/1992   European Pat. Off. .
4206996   6/1992   Germany .
63-275667 11/1988  Japan .

*Primary Examiner*—Morton Foelak
*Attorney, Agent, or Firm*—Connolly & Hutz

[57] ABSTRACT

The novel blend comprises:

(A) from 1 to 99% by weight of at least one thermotropic-liquid-crystalline polyester and/or polyesteramide and (B) from 1 to 99% by weight of at least one sulfoxide group-containing polymer, in each case based on the total weight $\Sigma[(A)+(B)]$. Component (B) is a linear and/or branched polymer having a mean molecular weight $M_w$ in the range from 4,000 to 200,000 comprising recurring units of the formula $[-F-S)_c-(F-SO)_d-]$, where F, independently of one another, are simple or para-, meta- or ortho-linked arylene systems having 6 to 18 carbon atoms, preferably phenylene, naphthylene or biphenylene, where the sum c+d is 1, with the proviso that d is always $\geq 0.70$. Component (A) is a thermotropic liquid-crystalline polymer having a mean molecular weight $M_w$ in the range from 10,000 to 200,000 g/mol and a transition temperature of >250° C., and/or an amorphous thermotropic liquid-crystalline polymer having a mean molecular weight $M_w$ of from 10,000 to 200,000 g/mol and a glass transition temperature of >160° C.

20 Claims, No Drawings

MIXTURES OF LIQUID-CRYSTAL POLYMERS AND POLYARYLENE SULFOXIDES, FOAMS MADE OF SUCH MIXTURES, PROCESS FOR THEIR PRODUCING THE SAME AND THEIR USE

The invention relates to mixtures based on liquid-crystalline polymers (LCPs) and polyarylene sulfoxides which, as blends, have improved properties on conversion into molding compositions. An example of an improved property is improved weld strength.

Foamed polymers are well known. They are used, in particular, where low weight or a high strength/weight ratio is required.

Foamed LCPs can be used as heavy-duty functional components, for example in aircraft and automobile production and in chemical apparatus production or as chemicals- or heat-resistant insulating materials.

In general, however, foaming impairs the mechanical properties of the polymer molding compositions to such an extent that they are no longer suitable for many areas of application. In addition to the inherent advantageous properties of foamed polymers, foamed LCPs are generally required where there is a need for the specific LCP properties, such as high tensile strength, high heat resistance, high chemicals resistance and high toughness, in particular notched impact strength. These foams should also have low anisotropy or orientation.

U.S. Pat. No. 4,429,060 describes high-performance foams made from liquid-crystalline, fully aromatic polyesters containing at least 10 mol % of 6-hydroxy-2-naphthoic acid units. These foams have a good strength/weight ratio, high heat resistance and excellent chemicals resistance. They have lower anisotropy than unfoamed LCPs. These foams can be produced by conventional methods, such as extrusion or injection molding. Foaming requires a blowing agent. Suitable blowing agents mentioned are 5-phenyltetrazole and trihydrazinetriazine.

U.S. Pat. No. 4,429,061 describes heat-treated LCP foams which have high rigidity and strength. The core of the LCP foams has highly oriented cell walls, whose properties are improved by heat treatment. These foamed LCPs have a low degree of anisotropy compared with unfoamed LCPs.

According to U.S. Pat. No. 5,210,107, however, the mechanical properties which can be achieved by means of the abovementioned foams are, owing to the coarse cell structure, inadequate to allow commercial exploitation.

LCP foams of the prior art can be produced either by means of chemical blowing agents or by addition of gases to the melt. The disadvantage of blowing agents is frequently about their health risks and their low melting point, which is frequently below the melting point of the LCPs. In addition, homogeneous mixing both with blowing agents and gases can only be achieved with great difficulty, which results in impaired mechanical property values.

It was an object of the present invention to develop molding compositions based on reactive polymer blends which, as such, have improved weld strength compared with the starting LCPs. A further object of the present invention was to develop a process for the preparation of foams comprising LCPs which are not produced by adding conventional blowing agents or adding gases to the melt of the LCPs to be foamed, but which nevertheless enable considerable expansion.

This object is achieved by a polymer mixture of the generic type mentioned at the outset, which comprises (A) from 1 to 99% by weight, preferably from 5 to 97.5% by weight, in particular from 10 to 95% by weight, of at least one thermotropic-liquid-crystalline polyester and/or polyesteramide and (B) from 1 to 99% by weight, preferably from 2.5 to 95% by weight, in particular from 5 to 90% by weight, of at least one sulfoxide group-containing polymer, where the percentages are each based on the total weight $\Sigma[(A)+(B)]$.

Surprisingly, it has been found that a mixture of thermotropic-liquid-crystalline polymers with polymers containing sulfoxide groups in the polymer chain readily form a foam. On exposure to heat, the thermally unstable sulfoxide decomposes, the sulfoxide groups being reduced to the sulfide. This is accompanied by the release of gases which act as blowing agents. It has also been found that the two mixture components can form a homogeneous molding composition, which can advantageously also be employed as such. Compared with the LCPs as such, the mixture has reduced anisotropy and improved weld strength.

The term "liquid-crystalline polymer" is taken to mean any thermotropic liquid-crystalline polymer having a mean molecular weight, expressed as $M_w$ (=weight average), of from 10,000 to 200,000 g/mol and a glass transition temperature of >250° C., or any amorphous thermotropic liquid-crystalline polymer having a mean molecular weight ($M_w$) of from 10,000 to 200,000 g/mol and a glass transition temperature of >160° C.

A class of liquid-crystalline polymers which is suitable for the mixtures of the invention comprises fully aromatic polyesters, described in U.S. Pat. No. 4,161,470. These are copolyesters containing recurring structural units of the formulae I and II

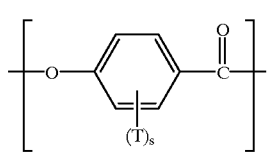

(I)

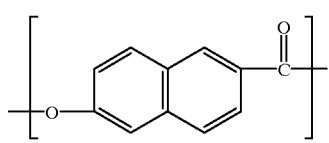

(II)

in which T is selected from the group consisting of an alkyl radical, an alkoxy radical, in each case having 1 to 4 carbon atoms, and a halogen, preferably chlorine, bromine or fluorine, s is zero or one of the integers 1, 2, 3 and 4, where, if more than one radical T is present in the molecule, these radicals are, independently of one another, identical to or different from one another. The naphthoyl-copolyesters contain from 10 to 90 mol %, preferably from 25 to 45 mol %, of structural units of the formula I and from 90 to 10 mol %, preferably from 85 to 55 mol %, of structural units of the formula II.

Further liquid-crystalline polyesters of the oxybenzoyl-copolyester type employed for the mixtures of the invention are described in EP-A-0 278 066 and U.S. Pat. No. 3,637, 595. The oxybenzoyl-copolyesters mentioned therein contain structural units of the formulae III, IV, V and VI, wherein each case one or more of said structural units can be present.

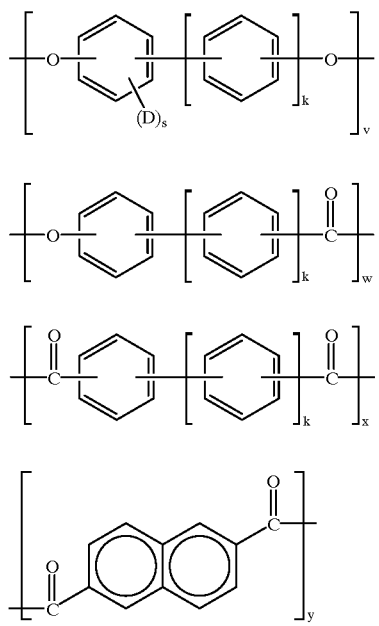

(III)

(IV)

(V)

(VI)

In the formulae III, IV, V and VI, k is zero or 1, v, w, x and y are integers identical to or greater than 1, D is selected from the group consisting of an alkyl radical having 1 to 4 carbon atoms, an aryl radical, and an arylalkyl radical, in each case having 6 to 10 carbon atoms, and a halogen, such as fluorine, chlorine or bromine, s is as defined above, where, in the case of more than one radical D, these radicals are, independently of one another, identical to or different from one another. The sum of the index numbers v, w, x and y has values of from 30 to 600. The oxybenzoyl-copolyesters generally contain from 0.6 to 60 mol %, preferably from 8 to 48 mol % of structural units of the formula III, from 0.4 to 98.5 mol %, preferably from 5 to 85 mol %, of structural units of the formula IV and from 1 to 60 mol %, preferably from 8 to 48 mol %, of structural units of the formula V and/or VI, the proportions of the structural units of the formulae III, IV, V and VI add up to 100 mol %.

Also suitable for the mixtures are copolyesters containing only structural units of the formulae III and V, or III and VI. These liquid-crystalline polymers generally contain from 40 to 60 mol % of structural units of the formula III and from 60 to 40 mol % of structural units of the formulae V and/or VI. The preferred molar ratio here is 1:1. Such polyesters are described, for example, in U.S. Pat. Nos. 4,600,765, 4,614, 790 and 4,614,791.

Also suitable are copolyesters which, in addition to the structural units selected from the formulae III to VI, also contain those of the formulae I and/or II, for example with a proportion of structural units of the formula I of from 15 to 1 mol %, with a proportion of structural units of the formula II of from 50 to 79 mol %, with a proportion of structural units of the formula III of 20 to 10 mol % and with a proportion of structural units of the formula V or VI of from 20 to 10 mol %.

Also suitable for the mixtures of the invention are copolyesteramides which, in addition to one or more structural units of the formulae I to VI, additionally contain at least one structural unit of the formula VII

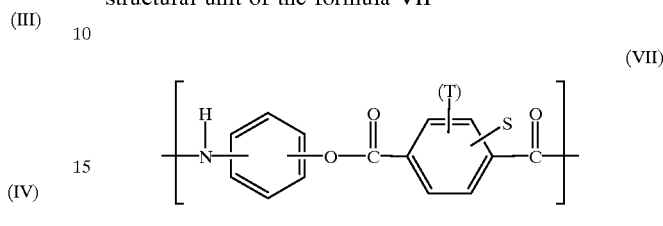

(VII)

in which T and s are as described above.

For the purposes of the present invention, the term "sulfoxide group-containing polymers (B)" is taken to mean polymers containing at least one arylene sulfoxide unit $$—Ar—SO—; \text{ Ar=arylene} \quad \text{(VIII)}.$$

Examples of arylenes are phenylene, biphenylene ($—C_6H_4—C_6H_4—$), naphthalene, anthracene or penanthrene, each of which may be monosubstituted or polysubstituted. Examples of substituents are straight-chain, cyclic or branched $C_1–C_{20}$-hydrocarbon radicals, such as $C_1–C_{10}$-alkyl radicals, for example methyl, ethyl, n-propyl, isopropyl, n-butyl, t-butyl, n-hexyl or $C_6–C_{14}$-aryl radicals, for example phenyl or naphthyl, halogens, sulfonyl, amino, nitro, cyano, hydroxy, alkoxy or carboxyl groups.

A preferred sulfoxide-containing polymer is polyphenylene sulfoxide, which can, for example, readily be prepared by oxidation of polyphenylene sulfide using ozone.

The foaming effect which can be achieved in accordance with the invention depends on the type of sulfoxide group-containing polymer, in particular on the amount of sulfoxide groups, and on the proportion of the sulfoxide group-containing polymer in the polymer mixture. In addition, the foaming effect depends on the melt viscosity of the LCP to be foamed.

The heating of the starting polymers can be carried out in accordance with the invention in a temperature range of from 280 to 340° C. The temperature is preferably in the range from 300 to 320° C.

The invention also allows the use of mixtures of various sulfoxide group-containing polymers. It is also possible to add a further polymer, such as polyarylene sulfide, to the mixture to be foamed.

The LCPs can be employed, for example, as powders, compacts, fibers or films. The powders have standard commercial particle sizes, it also being possible to use granules. If the polymers are used in the form of fibers, these are employed as staple fibers, microfibers, needle felt, nonwoven material, card sliver or woven fabric. It is also possible to use films or shredded films in a suitable form.

The sulfoxide group-containing polymers should be used in powder form in order to achieve a homogeneous foam. The mean particle size ($D_{50}$ value) is in the range from $0.3 \cdot 10^{-6}$ to $500 \cdot 10^{-6}$ m, preferably from $0.5 \cdot 10^{-6}$ to $300 \cdot 10^{-6}$ m, in particular from $0.5 \cdot 10^{-6}$ to $200 \cdot 10^{-6}$ m.

The polymer mixture based on liquid-crystalline polymers and polyarylene sulfoxides can generally be employed as an unblended material. However, it is also possible to add further fillers, such as chalk, talc, clay and mica, and/or fibrous reinforcing materials, such as glass fibers, carbon fibers and whiskers, and further additives and processing auxiliaries, for example lubricants, release agents, antioxidants and UV stabilizers.

The novel foams and the unfoamed mixtures themselves can be used for the production of moldings. The moldings can be used as heavy-duty functional components, for example in aircraft and automobile production. Further uses of the moldings are in chemical apparatus production. The foams or moldings can be used as chemicals- or heat-resistant insulating materials.

The advantages of the novel process for the preparation of foam-form polymer structures are that there is no need to add low-molecular weight blowing agents, the process is simple to carry out, it is not necessary to use environmentally damaging blowing gases, LCP foams of particularly low density are possible, and that the degree of foaming and the pore size can be set within a broad range.

The invention is illustrated in greater detail below for the person skilled in the art, through the working examples, but is not intended to be restricted to the embodiments described specifically.

EXAMPLE 1

A mixture was prepared from 90% by weight of the liquid-crystalline polyester ®Vectra A 950 from Hoechst AG and 10% by weight of polyphenylene sulfone (PPSO). ®Vectra A 950 was in granular form, and the PPSO was in the form of a powder having a particle size, expressed as the $d_{50}$ value, of 60 µm.

The PPSO used was the product prepared in Example 1 of DE-A 43 14 737.6.

The mixture, which had been dried at a temperature of 180° C., in vacuo, under nitrogen and for a period of 12 hours, was converted into granules in an LSM 34 twin-screw extruder from Leistritz, Nuremberg.

EXAMPLE 1A

Processing parameters:
Barrel temperature: 285° C.
Speed of rotation: 40 rpm

The extrudate and granules exhibited the normal appearance of the LCP ®Vectra, and there was no evidence of a foamlike structure.

EXAMPLE 1B

Processing parameters:
Barrel temperature: 330° C.
Speed rotation: 40 rpm

The extrudate and granules exhibited a foamlike structure.

Test specimens were produced from both the granules from 1A) and 1B) in an injection-molding machine (type KM090/210B, Krauss-Maffei, Munich, Germany) with the following process parameters:

| Barrel temperatures: | |
|---|---|
| Heating zone (HZ) 1: | 280° C. |
| HZ 2 to 5: | 285° C. |
| Nozzle temperature: | 285° C. |
| Mold temperature: | 120° C. |

The properties of the test specimens were measured immediately after production. The specimens made from both granules 1A) and 1B) did not have a foamlike structure.

The density was determined in accordance with DIN 53479.

The tensile properties (modulus of elasticity, tensile strength and elongation) were determined in accordance with ISO 527, with a crosshead speed of 5 mm/min. The test specimen used was a No. 3 tensile test piece.

The tensile properties (modulus of elasticity, tensile strength and elongation) parallel and perpendicular to the flow direction of the polymers to the injection mold were measured on test specimens measuring 80×10×4 mm which had been cut perpendicular and parallel to the flow direction out of sheets (film date) measuring 80×80×4 mm. The samples were tested at a crosshead speed of 5 mm/min.

The tensile test was carried out on test specimens with a weld line under the same conditions. The test specimen used here was a double-gated tensile test piece with a butt weld seam in the center of the test specimen. The weld strength was calculated from the quotient of the maximum tensile strength with and without weld seam. A suitable measure for assessing the weld seam behavior can also be the elongation at break of the bilaterally gated tensile test piece.

The heat deflection temperatures HDT A and C were determined in accordance with DIN 53 461. The test specimens measured 120×10×4 mm.

For comparison, ®Vectra A 950 was extruded as in Example 1A, injection moulded and tested (Example 1C). The results of all examples are shown in Table 1 below.

TABLE 1

| Example | 1A | 1B | 1C |
|---|---|---|---|
| Density [g/cm³] | 1.404 | 1.404 | 1.398 |
| Modulus of elasticity in tension [N/mm²] | 7770 | 7670 | 9340 |
| Tensile strength [N/mm²] | 126 | 121 | 150 |
| Elongation at break [%] | 3.7 | 3.5 | 2.9 |
| Tensile stress - weld seam [N/mm²] | 21 | 21 | 13 |
| Elongation at break - weld seam [%] | 0.5 | 0.4 | 0.2 |
| Weld strength [%] | 17 | 17 | 8 |
| Heat deflection temperature HDT A [° C.] | 160 | 167 | 165 |
| Heat deflection temperature HDT C [° C.] | 95 | 99 | 98 |
| Modulus of elasticity [N/mm²] perpendicular to the flow direction | 1.612 | 1.510 | 1.510 |
| Yield stress [N/mm²] perpendicular to the flow direction | 45.1 | 42.8 | 48.4 |
| Elongation at break [%] perpendicular to the flow direction | 4 | 3.3 | 5.7 |

TABLE 1-continued

| Example | 1A | 1B | 1C |
|---|---|---|---|
| Modulus of elasticity [N/mm²] parallel to the flow direction | 2.410 | 2.150 | 2.320 |
| Yield stress [N/mm²] parallel to the flow direction | 74.2 | 74.6 | 82.6 |
| Elongation at break [%] parallel to the flow direction | 2.5 | 3.5 | 3.8 |

Thermoanalytical measurements:
DSC analyses were carried out on the mixtures prepared as described in Examples 1A) and 1B):

| | |
|---|---|
| DSC measurement equipment: | DSC-7, manufacturer Perkin-Elmer, Überlingen, Germany |
| Measurement conditions: | Measurement atmosphere: nitrogen |
| | Heating rate/cooling rate: 20° C./min |
| | Temperature programme |
| | 1st heating from −10° to 380° C. |
| | Cooling from 380° C. to −10° C. |
| | 2nd heating from −10° C. to 380° C. |

During the 1st heating, the mixture of Example 1A) showed an exothermicity at 370° C. (peak), and the mixture of Example 1B) showed an exothermicity at 359° C. (peak). No exothermicity was observed during the 2nd heating.

The exothermicity is the crosslinking reaction of LCP with PPSO. In the case of prior activation, as for the mixture of Example 1B), the exothermicity continues at lower temperatures.

EXAMPLE 2

Granules produced as described in Example 1A were converted into sheets with a diameter of 60 mm in a press (Polystat 200S, Schwabenthan, Berlin) at various pressing temperatures. The pressing pressure was 8 bar, and the pressing time was 25 min. The results are shown in Table 2.

TABLE 2

| Pressing temperature [° C.] | Weight of the pressed sheets [g] | Density [g/cm³] | Notes |
|---|---|---|---|
| 280 | 19.99 | 1.382 | no foaming |
| 290 | 20.05 | 1.388 | no foaming |
| 300 | 19.98 | 1.385 | no foaming |
| 310 | 19.92 | 1.153 | structural foam, closed-cell |
| 315 | 18.19 | 0.662 | structural foam, closed-cell |
| 320 | — | — | polymer runs out of the mold |

EXAMPLE 3

Granules produced as described in Examples 1A and 1B were heated for various periods in test tubes in a block thermostat (type: Unitherm from Liebisch, Bielefeld) at various temperatures, and observations on foaming were recorded. The results are shown in Table 3 below.

TABLE 3

| Temperature [° C.] | Time [min] | Granules 1A | Granules 1B |
|---|---|---|---|
| 280 | 30 | − | − |
| 280 | 60 | − | − |
| 290 | 10 | − | + |
| 290 | 30 | + | + |
| 300 | 10 | + | + |
| 300 | 30 | + | ++ |
| 310 | 10 | + | ++ |
| 310 | 30 | collapses | collapses |

−: no expansion of the granules
+: slight expansion of the granules
++: considerable expansion of the granules

EXAMPLE 4

Mixtures were prepared from the following:
1% of PPSO
99% of LCP (Example 4A)
5% of PPSO
95% of LCP (Example 4B)
10% of PPSO
90% of LCP (Example 4C)
100% of LCP (Comparative Example 4D)

The liquid-crystalline polyester used was ®Vectra A 950 from Hoechst AG. The PPSO used was the product prepared as described in Example 1 of DE-A 43 14 737.

®Vectra A 950 was in granular form, and PPSO was in the form of a powder ($d_{50}$=60 μm).

The dried mixtures (dried at 130° C., vacuum, $N_2$, about 12 hours) were compounded in a compounder (type: Rheomix 600 from Haake Buchler, Karlsruhe) for 20 minutes at 280° C. Immediately thereafter, a sheet was pressed at 280° C. (press type: Polystat 200S from Schwabenthan, Berlin), and the viscosity thereof was determined at 280° C. as a function of the shear rate (frequency sweep) in a rheometer (type: dynamic spectrometer model RDS-II from Rheometrics, Frankfurt).

No foaming occurred during production and measurement of the samples.

Results of the viscosity measurements:

The viscosity dropped over the entire frequency range with increasing PPSO content. In addition, the mixture of Example 4C was pressed at 290° C., 305° C. and 315° C. and the viscosity was determined at 290° C. Foaming was observed during pressing at 315° C. and to a slight extent at 305° C. No foaming was observed at 290° C. The higher the pressing temperature, i.e. the more complete crosslinking reaction, the higher the viscosity over the entire frequency range at 290° C.

We claim:

1. A foamed polymer material comprising a foamed product obtained when foaming a foamable blend comprising:
   (A) from 1 to 99% by weight of at least one thermotropic-liquid-crystalline polyester or polyesteramide or combination thereof, and
   (B) from 1 to 99% by weight of at least one polymer which contains at least one arylene sulfoxide unit AR—SO—, where AR is arylene, in each case based on the total weight Σ((A)+(B)), wherein the foamed polymer material has a density of at least 50% lower than a density of the foamable blend before it is foamed.

2. The foamed polymer material as claimed in claim 1, wherein the foam is a structural foam.

3. A process for the production of the foamed polymer material as claimed in claim 1, which comprises subjecting the foamable blend to heat treatment at a temperature of from 280 to 340° C.

4. The process as claimed in claim 3, wherein the heat treatment is carried out at a temperature of from 300 to 320° C.

5. The process as claimed in claim 3, wherein the heat treatment is carried out for a time of from 5 to 30 minutes.

6. A method for making a molded article comprising the step of molding the foamed polymer material as claimed in claim 1.

7. The foamed polymer material as claimed in claim 1, further comprising a material selected from the group consisting of chalk, talc, clay, mica, a glass fiber, a carbon fiber, a carbon whisker, a lubricant, a release agent, an antioxidant, a UV stabilizer, and a mixture thereof.

8. A foamable blend comprising:
   (A) from 1 to 99% by weight of at least one thermotropic-liquid-crystalline polyester or polyesteramide or combination thereof, and
   (B) from 1 to 99% by weight of at least one polymer which contains at least one arylene sulfoxide unit AR—SO—, where AR is arylene, in each case based on the total weight Σ((A)+(B)).

9. The foamable blend as claimed in claim 8, wherein the component (B) is a linear or branched polymer or combination of linear and branched polymers having a mean molecular weight, $M_w$, in the range from 4,000 to 200,000 comprising recurring units of the formula [—(F—S)$_c$—(F—SO)$_d$—], and where the F groups, independently of one another, are simple or para-, meta- or ortho-linked arylene systems having 6 to 18 carbon atoms, and where the sum c+d is 1, with the proviso that d is always $\geq 0.70$.

10. The foamable blend as claimed in claim 9, wherein at least one F group is phenylene, naphthylene or biphenylene.

11. The foamable blend as claimed in claim 8, wherein the component (A) is a thermotropic mixed-crystalline polymer having a mean molecular weight, $M_w$, in the range of 10,000 to 200,000 g/mol and a glass transition temperature of >250° C., or an amorphous thermotropic liquid-crystalline polymer having a mean molecular weight, $M_w$, of from 10,000- to 200,000 g/mol and a glass transition temperature of >160° C. or a combination of the thermotropic mixed-crystalline polymer and the amorphous thermotropic liquid-crystalline polymer.

12. The foamable blend as claimed in claim 8, which additionally comprises a thermal stabilizer, a UV stabilizer, an antistatic, a flameproofing agent, a dye, a pigment, an inorganic filler, an organic filler or a combination thereof.

13. The foamable blend as claimed in claim 8, wherein the mean particle size, $d_{50}$, of the component (B) is in the range from $0.3 \cdot 10^{-6}$ to $500 \cdot 10^{-6}$ m.

14. The foamable blend as claimed in claim 8, wherein the mean particle size, $d_{50}$, of the component (B) is in the range from $0.5 \cdot 10^{-6}$ to $300 \cdot 10^{-6}$.

15. The foamable blend as claimed in claim 8, wherein the mean particle size, $d_{50}$, of the component (B) is in the range from $0.5 \cdot 10^{-6}$ to $200 \cdot 10^{-6}$.

16. A method for making a molded article comprising the steps of subjecting the foamable blend as claimed in claim 8 to heat treatment at a temperature which produces a foam, and molding the resulting foam to obtain the molded article.

17. The molded article produced by the method as claimed in claim 16, having increased weld strength and reduced viscosity, in each case compared with the weld strength and viscosity of the component (A) of the foamable blend as claimed in claim 8 before it is foamed.

18. An aircraft part, an automobile part, a chemical apparatus part, a heat-insulating part, or a chemical-resistant part comprising the molded article of claim 17.

19. The foamable blend as claimed in claim 8, wherein 5 to 97.5% by weight of the component (A) is present, and 2.5 to 95% by weight of the component (B) is present.

20. The foamable blend as claimed in claim 8, further comprising a polyarylene sulfide polymer.

\* \* \* \* \*

UNITED STATES PATENT AND TRADEMARK OFFICE
CERTIFICATE OF CORRECTION

PATENT NO. : 5,948,830
DATED : September 7, 1999
INVENTOR(S) : Helmut Scheckenbach et al.

It is certified that error appears in the above-identified patent and that said Letters Patent is hereby corrected as shown below:

On the cover page, the TITLE section [54], delete "THEIR" (first occurrence).

In claim 9, last line (column 9, line 42), change "$\geqq$" to -- $\geq$ --.

Signed and Sealed this

Eighteenth Day of April, 2000

Q. TODD DICKINSON

Attest:

Attesting Officer

Director of Patents and Trademarks